United States Patent [19]

Kawai

[11] 4,124,363
[45] Nov. 7, 1978

[54] METHOD AND APPARATUS FOR MANUFACTURING INORGANIC FIBER THROUGH PENDENT PROCESS AND APPARATUS FOR CARRYING OUT THE SAME

[75] Inventor: Motochika Kawai, Fujisawa, Japan

[73] Assignee: Japan Inorganic Material Co., Ltd., Kanagawa, Japan

[21] Appl. No.: 824,653

[22] Filed: Aug. 15, 1977

Related U.S. Application Data

[63] Continuation-in-part of Ser. No. 749,693, Dec. 13, 1976, abandoned, which is a continuation-in-part of Ser. No. 575,532, May 8, 1975, abandoned, which is a continuation of Ser. No. 468,288, May 8, 1974, abandoned.

[51] Int. Cl.$^2$ ............................................. C03D 37/02
[52] U.S. Cl. ........................................... 65/2; 65/4 R; 65/9; 65/11 R
[58] Field of Search ................ 65/1, 2, 4 R, 3 R, 3 C, 65/9, 5, 11 R, 16

[56] References Cited

U.S. PATENT DOCUMENTS

| | | | |
|---|---|---|---|
| 2,494,999 | 1/1950 | Halkins | 65/9 |
| 2,729,030 | 1/1956 | Slayter | 65/9 X |
| 2,897,874 | 8/1959 | Stalego et al. | 65/9 X |
| 3,125,485 | 3/1964 | Constantine et al. | 65/9 X |

Primary Examiner—Robert L. Lindsay, Jr.
Attorney, Agent, or Firm—Toren, McGeady and Stanger

[57] ABSTRACT

A method and an apparatus for manufacturing an inorganic fibers through a pendent process wherein melted glass is allowed to flow down by its own weight in a state of fine streams through a plurality of nozzle holes perforating through the bottom of a glass melting furnace; the pendent fine streams of melted glass are guided through a guide member to an intermediate nipping part formed by a pair of vaned rotors or rolls to make them into fibers by inserting them in between layers of air flowing at a high velocity through clearances provided between the circumferences of the rotors or rolls and their covers; a binder is added to the fibers thus produced; and then the fibers are transferred by suction on to an endless conveyor to be formed into a coiled or sheet-like product.

2 Claims, 5 Drawing Figures

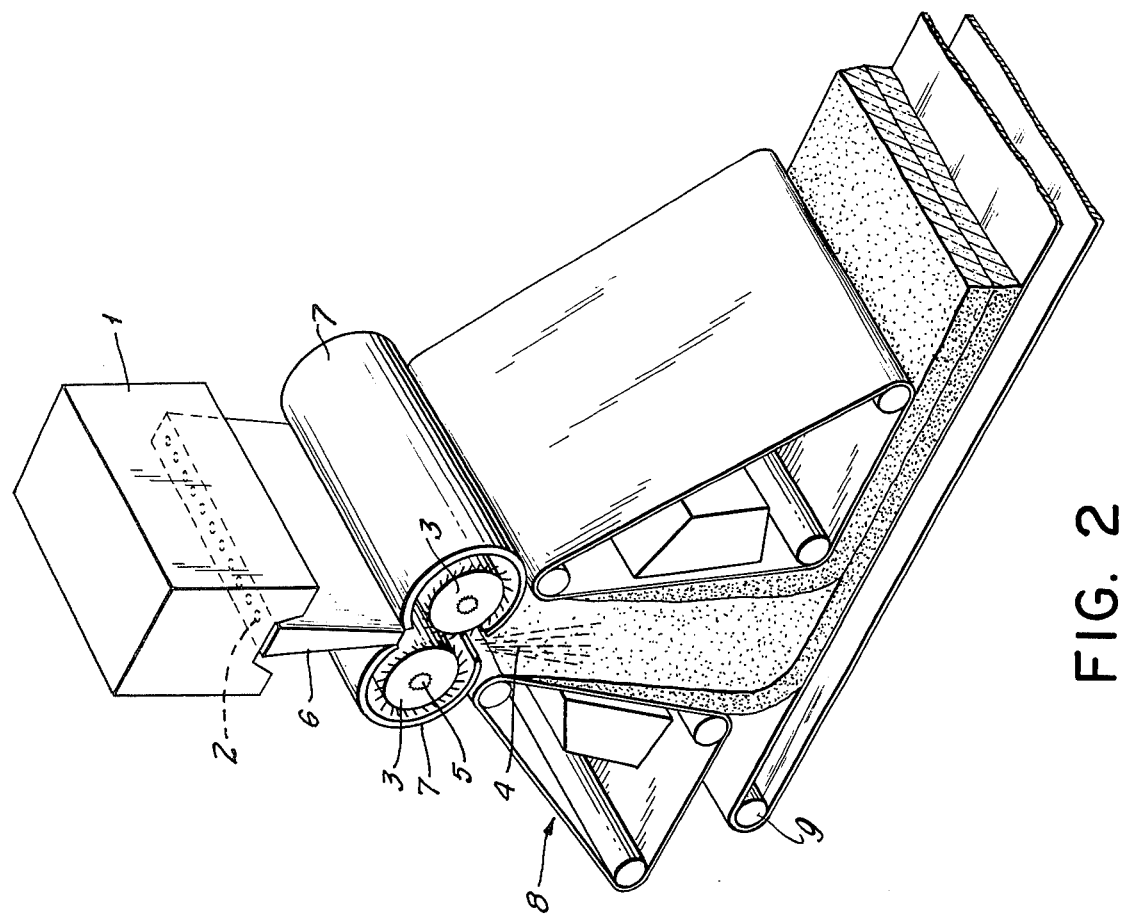

METHOD AND APPARATUS FOR MANUFACTURING INORGANIC FIBER THROUGH PENDENT PROCESS AND APPARATUS FOR CARRYING OUT THE SAME

CROSS REFERENCE TO THE RELATED APPLICATION

This invention is a continuation-in-part of our co-pending U.S. patent application Ser. No. 749,693 filed Dec. 13, 1976, which in turn is a continuation-in-part of application Ser. No. 575,532 filed May 8, 1975, which is in turn a continuation of application Ser. No. 468,288 filed May 8, 1974 all abandoned.

BACKGROUND OF THE INVENTION

This invention relates to a method and an apparatus for manufacturing inorganic fiber mats usable as heat insulating materials through a process of forming short fibers of glass.

The conventional methods of forming glass fiber include a pendent take-up method, a pendent blow-off method, a centrifugal method, etc. By such conventional methods, however, the formed fibers have a thin, long shape requiring complex and difficult processes. Besides, as described in the copending U.S. patent application Ser. No. 749,693, such conventional methods bring about undesirable environment for manufacturing work, a public nuisance, increase in labor cost and so on. Such shortcomings of the conventional methods thus have hitherto presented various problems.

Particularly, in the cases of methods disclosed in U.S. Pat. Nos. 2,729,027 and 2,729,030 (Games Slayter et al.) and also in U.S. Pat. No. 2,736,676 (P. J. Frickert), these methods relate to processes of forming continuous long fibers into strand mats. In such a method, a pair of rubber rollers of narrow width are used to squeeze continuous filament strands and to forward them while evenly spreading them on a conveyer of desired width for forming them into a mat-like shape. In accordance with such a conventional method, the melted glass is extruded in a bundle of hundreds of filaments from a nozzle plate. These rollers are arranged to securely catch the bundle of continuous filaments and to pull them downward. This entangles them and brings them into contact with each other. Therefore, to prevent the continuous glass filaments from being broken or crashed during such a process, there is provided a rubber cushion. The products manufactured in this manner have a great specific gravity and excels in strength and are employed as a reinforcement material for the purposes of heat insulation or sound absorption and in FRP and FRC.

SUMMARY OF THE INVENTION

It is a principal object of this invention to provide a method and an apparatus for the manufacture of mats and the like from glass fibers. In accordance with the method of this invention, any heat source other than electric energy, such as petroleum fuel, is not used during a process of making short fibers. This precludes pollution of the atmosphere by combustion of petroleum fuel, which discharges sulfur oxide, nitrogen oxide or carbon oxide into the air thus causing a public nuisance. The manufacturing process can be carried out continuously and very efficiently because it is not interrupted except for maintenance services or repair work on the apparatus.

As illustrated in FIG. 1 of the accompanying drawings, in the inorganic monofilament manufacturing processes continuously carried out in accordance with this invention, melted glass is first brought into a state of fine pendent streams of filaments. Scores of the pendent fine streams of filaments are simultaneously guided through a guide member to a nipping part provided between a pair of vaned rotors which are rotating in the directions opposite to each other. The pendent fine streams of filaments are inserted in between layers of air flowing at a high speed along the clearances between the vaned rotors or rolls and their covers to form them into flat monofilaments. Then, by an ordinary known process, a binder such as a water soluble phenol resin is added to the filaments. Following the addition of the binder, the filaments are shaped into a form of a mat or a felt sheet of fibers having predetermined width and thickness on an endless conveyer and the binder resin is allowed to cure thereon. The product thus prepared is either coiled on a roll or cut into a sheet-like form.

In other words, in the invented manufacturing method, fine streams of melted glass flow down through nozzle holes perferating the bottom of a melting furnace; the fine pendent streams of melted glass are made into short filaments or fibers by means of a pair of vaned rotors or rolls which rotate at a high speed. The short monofilaments or fibers which are prepared in this manner are placed on a conveyer which is equipped with a suction mechanism and are thus shaped into a felt, mat or web form thereon. During this forming process, a suitable binder is added to the monofilaments by spraying. Following this, the shaped fiber material is transferred to a curing furnace. After curing in the furnace, the fiber material is cut into desired dimensions to obtain a finished product.

An important feature of the invented method lies in that: The fine streams of melted glass are allowed to come down to a pair of vaned rotors which rotate at a high speed and which have the same width as that of the product to be manufactured. The fine streams are inserted into a narrow gap of a nipping part provided between the confronting pair of rotors or rolls to make the tips of the fine streams of melted glass into a flat shape through the gap. Then the flatened tips of fine streams of melted glass are blown further into the nipping part between these rotors where high speed air streams are flowing in the directions opposite to each other to split the flatened tips of the fine streams into short fibers.

The above and further objects, features and advantages of this invention will become apparent from the following detailed description of a preferred embodiment of this invention taken in connection with the accompanying drawings.

BRIEF DESCRIPTION OF THE DRAWINGS

FIG. 1 is a flow diagram illustrating manufacturing processes arranged in accordance with this invention.

FIG. 2 is an oblique view illustrating the construction of an apparatus to be employed in carrying out the method of this invention.

Figure 3A:
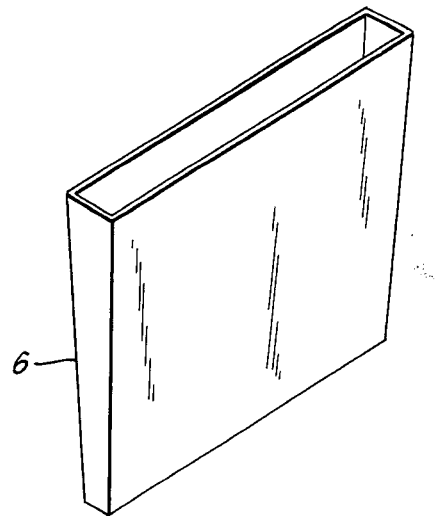
FIG. 3(a) is an enlarged oblique view illustrating a guide member of the apparatus.

A preferred embodiment of this invention is described in detail below with reference to the accompanying drawings. It is, however, to be understood that the invention is not limited thereto but may be otherwise variously embodied within the purview of the appended claims.

DESCRIPTION OF PREFERRED EMBODIMENT

Referring to FIG. 2, which illustrate an apparatus as a preferred embodiment of this invention, the apparatus comprises a glass melting furnace 1 having many nozzle holes which perforate a bottom plate thereof and are arranged in rows; a guide member 6 which is disposed immediately below the rows of nozzle holes to vertically suspend therefrom; vaned rolls (or rotors) 3 which are disposed close to the lower end of the guide member 6 and which confront each other to form a nipping part between them, the vaned rolls being arranged to rotate in the directions opposite to each other; an endless belt conveyer 8 which is disposed below the vaned rolls 4 and is equipped with a suction mechanism; a take-up roll 9 which is disposed at the end of the belt conveyor 8; and an unillustrated cutting mechanism. These confronting rolls 3 are covered by tubular covers 7. A portion of the outer circumference of each of the covers 7 is in contact with a side wall of the lower end of the guide member 6 and the outer circumferential face of each cover 7 detaches from the wall of the guide member to open at to the nipping part formed by the confronting rolls 3.

Figure 3B:
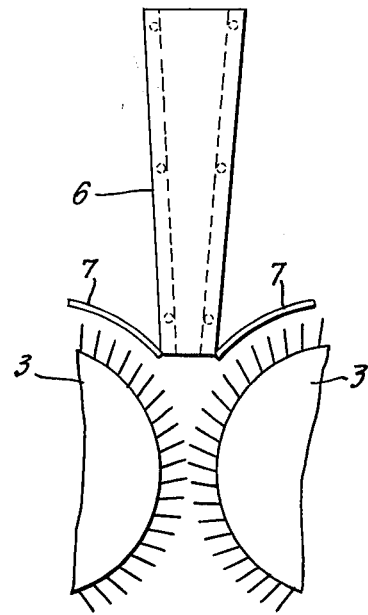
FIG. 3(b) is a sectional view of FIG. 3(a).

FIG. 3 illustrates the details of the guide member 6 which is vertically suspended downward from the glass melting furnace 1. The guide member is arranged to extend from the melting furnace down to a point close to the nipping part between the confronting vaned rolls 3. Both side walls of the guide member 6 are provided with a jacket water cooling mechanism to prevent the guide member 6 from being overheated and to keep the inner face of each side wall in a state of being lined with a thin layer of an air curtain, which serves to prevent the melted fine glass streams coming down from the melting furnace 1 from contacting with and sticking to the inner wall faces of the guide member 6. With the guide member 6 suspended from the furnace in the above mentioned manner, the fine streams 4 of melted glass are allowed to come down by own weight without being affected by undesirable winds which arise around there and are thus allowed to reach the nipping part between the confronting rolls 3 passing through the guide member 6 in a stable condition. On the confronting inner wall faces of the guide member 6, there are provided blowing air layers in such a way as to have different air curtain speeds there in two or three steps within a height of about 30 cm. The air curtain speeds are adjusted to be the same as or higher than the falling speed of the pendent fine glass streams 4. The fine streams 4 come down inside the guide member 6 at a falling speed which increases as their thickness decreases from 2 mm to 1.3 mm in diameter. The rate of draft with which the pendent fine glass streams 4 are loaded inside the guide member 6 becomes more than two times to cut their tips into subdivisions and the streams 4 come to be inserted into the nipping part perpendicular thereto in a flatened shape. Where the temperature of the pendent fine glass streams coming from the melting furnace is high and the number of the pendent fine streams is great, the apparatus might be overheated resulting in a trouble in carrying out the manufacturing process. The water cooling arrangement mentioned in the foregoing is provided to prevent such a trouble arising from overheating. Cooled air may be blown to the confronting rolls or, alternatively, atomized water may be sprayed thereto. It is also possible to provide an air cooling mechanism as required. Although it is of course highly desirable for obtaining fibers to keep the pendent fine stream 4 of melted glass at a high temperature until they change into filaments and then are formed into short fibers, the air which is flowing at a high speed for making them into fibers and the apparatus itself do not have to be kept at a high temperature.

Figure 4:
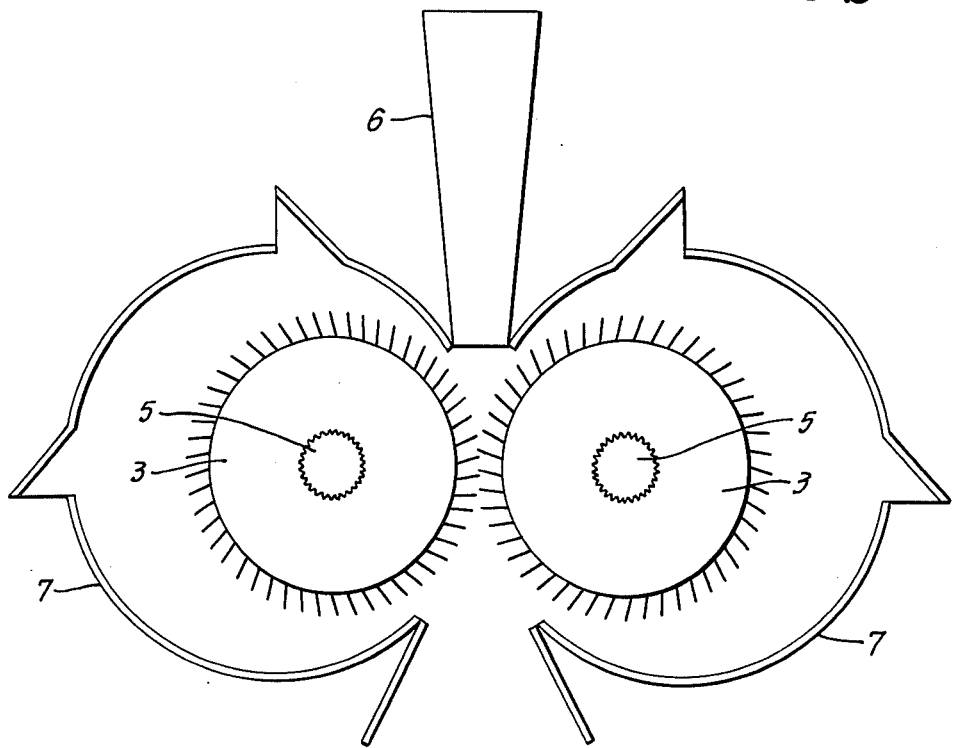
FIG. 4 is an enlarged partial side view illustrating the relative positions of the guide member and confronting rotors.

FIG. 4 is an enlarged side view illustrating the details of the pair of rolls mentioned in the foregoing. In this particular embodiment, each vaned roll 3 measures 1 meter in width and 500 mm in diameter. The gap formed at the nipping part between the confronting vaned rolls 3 measures 2 to 5 mm. The rolls rotate at a speed of 3,000 to 4,000 or 1,500 to 2,000 r.p.m. The number of vanes provided on the outer circumference of each roll 3 is 24 to 36. The number, width, tilting angle, material and structure, etc. of the vanes are to be selected in accordance with the manufacturing conditions. In this particular embodiment, however, these vanes are made of heat-resistant soft rubber or metal plates.

The vanes provided on the rolls 3 hit the fine pendent glass streams to divide them into many short fibers. The dividing process can be accomplished more easily at a higher temperature of the fine glass streams. It is, therefore, preferable to make the distance between the nozzle holes provided in the bottom of the glass melting furnace 1 and the nipping part between the confronting rolls 3 as short as possible. For this reason, the distance in this particular embodiment is arranged to be about 30 to 40 cm. The pair of rolls are preferably of latchet type as shown in FIG. 4, so that the rolls are rotatable by the air blow alone. The air blown in through each blowing hole provided in the inner wall of the guide member form an air curtain and comes from the outer circumference of the cover surrounding each roll to enter a clearance provided between the outer circumference of the roll and its cover. The air then circulates inside the clearance at a high speed. This not only accelerates the rotation of the roll but also increases the density of an air layer there. In addition to such, the air also plays an important role of aiding each roll vane in hitting the pendent fine glass streams and dividing them into short fibers, because such an air flow then effectively enables to obtain very fine fibers.

The above stated air is cooled as necessary and may be introduced from a portion of air discharged from a fan of a suction mechanism provided in the conveyer arrangement or may be from an air compressor. Further, in addition to the cooling air for preventing the overheating of the rolls and other components, atomized water may be supplied from the outside of the apparatus to enhance the cooling effect thereby.

The above stated vanes of the rolls serve to firmly maintain the circulating air layers which circulate inside the clearance between the rolls and their covers 7 at a high speed. In other words, the vanes ensure that the entrained air layers circulate at almost the same speed as the rotating speed of the outer circumference of each roll. Further, these vanes also effectively serve, without fail, to mechanically make into fibers the pieces which come from the fine streams escaping from the above stated layers of air and which have not yet been made into fibers.

As mentioned in the foregoing, the pendent fine streams of melted glass which pass through the guide member reach the nipping part between the confronting rolls while they are being divided into small pieces. The pendent fine streams of glass are then induced by the above stated air curtain to join air layers which surround the surfaces of the rolls to rotate together with the rolls. The fine streams are sandwiched in between these air layers while some draft action is exerted for a short period of time in a preliminary step before they reach the limit point of the nipping part. When the fine streams reach the limit point of the nipping part, the highest draft action is exerted on these streams.

The speed at the entrance of the guide member: 0.24 m/sec.
The speed at the exit of the guide member: 0.5 m/sec.
The speed of the confronting roll nipping part: 4,000 m/min. = 66 m/sec.
Accordingly, the draft acts to a degree of:
66 m ÷ 0.5 = 132
66 m ÷ 0.24 = 275
or thereabout.

The viscosity of the melted glass decreases as it cools down and the efficiency of the draft decreases accordingly. Therefore, the effective draft is lower than the above values and the efficiency is about 80 to 90%.

The tip of each fine stream of melted glass is flatened and is splitt into a plurality of filaments along the flatened width of the stream. This is an advantage of the invention, because much finer monofilaments can be obtained in much greater quantity from each fine stream than making the stream thinner without such a flattening and splitting process.

When the rotating speed of the surfaces of the confronting rolls is set at a rate about 4,000 m/min. for obtaining short wool under the conditions mentioned in the foregoing, the results are as shown below:

Thickness of fiber: Bulk 7.2$\mu$ (6–9$\mu$)
Length of fiber: 3–6 cm
Adherent phenol resin binder: 4.5% (short wool)
Concentration of spray liquid: 2–3%
Productivity with 20 nozzles used: 125 kg per hour Experiments were conducted in accordance with the method of this invention and the results were as described below.

The thickness of the pendent melted glass streams was set between 1.0 and 4.0 mm and preferably between 1.5 and 2.0 mm. A waste of sheet glass for windows was employed as material.

The chemical composition of the glass material:

72%: $SiO_2$; 3.5%: $MgO$; 1.3%: $Al_2O_3$; 14.3%: $Na_2O$; 8.2%: $CaO$; 0.3%: $K_2O$.
Glass melting temperature: 1475° C. (1450°–1495° C.)

Nozzle diameter: 7.5 mm (nozzle made of alumina refractories).
Thickness of nozzle: 12 mm.
Shape of nozzle hole: Rectangular sectional shape.
Diameter of pendent fine stream of melted glass: About 2.0 mm
Weight dropping down per second: 1.84 g/sec. (6.624 kg/hour).
Dropping rate per second: 24.0 cm/sec.

Figure 5:
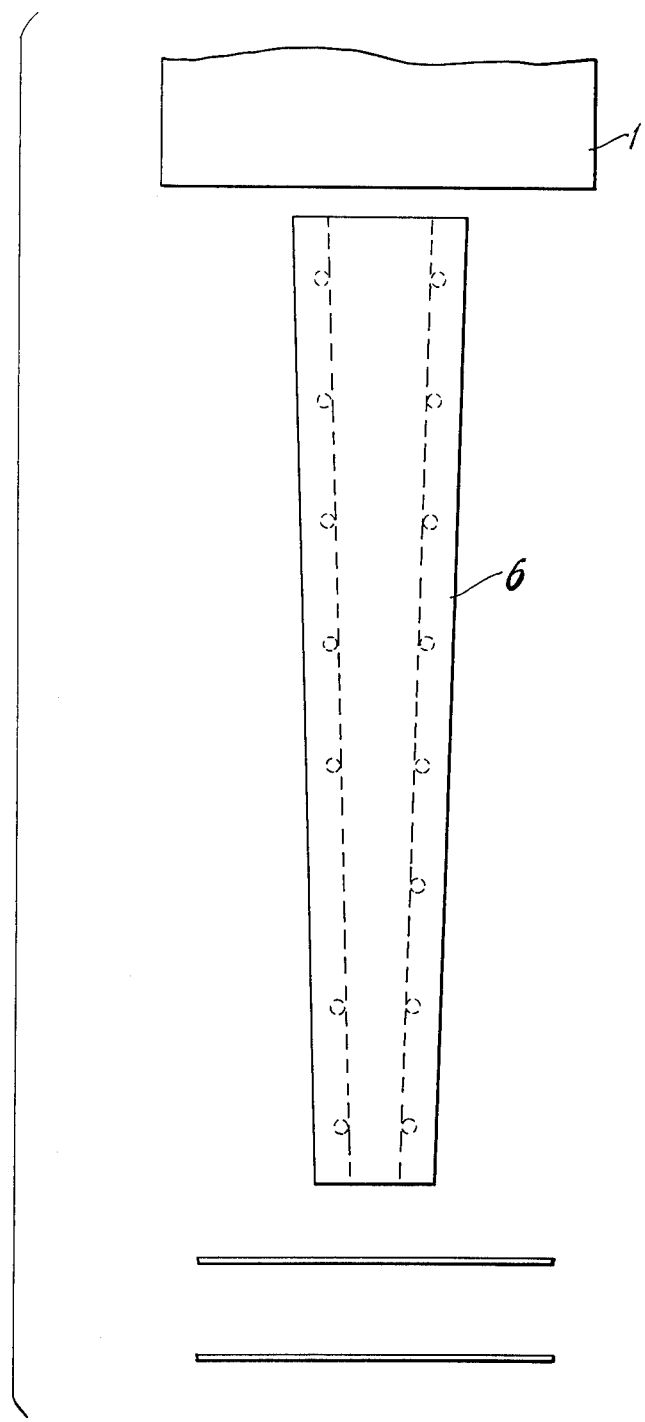
FIG. 5 shows a modification of the present invention.

When the glass melting temperature was less than 1370° C., the diameter of each pendent fine stream became uneven and the stream was thick in some parts and thin in other parts. According to the modification shown in FIG. 5, the pair of rolls (3)(3) are omitted and the guide member 6 is swingable over the width of the cover and has a plurality of nozzles from which are blown to the molten glass to divide it finely into short fibers and drop the fiber on the conveyer.

What is claimed is:

1. A method for manufacturing glass short fibers comprising melting glass in a heating furnace, allowing the melted glass to flow in a state of fine streams through a plurality of nozzle holes provided in the bottom of the furnace; introducing a plurality of the fine glass streams thus allowed to come down into a guide member to be guided to a nipping part formed between a pair of vaned rolls which rotate at a high speed, flowing air at high speed through clearance provided between the outer circumferences of said vaned rolls, the rolls rotating in opposite directions to advance the streams through the clearance and to finely break the fine glass streams into short fibers, adding a water soluble binder to said short fibers; then, transferring said short fibers on to an endless conveyer; and forming the short fibers into a mat or felt product.

2. An apparatus for manufacturing glass fibers comprising a heating furnace for melting a waste glass material, the furnace having many nozzle holes perforating through the bottom plate thereof, the nozzle holes being arranged in rows; a guide member disposed immediately below said nozzle holes to suspend therefrom, the guide member having a water cooling arrangement for both side walls thereof and having a plurality of air blowing ports arranged in steps to form thin layers of air curtains covering the inner wall faces of the guide member; a pair of rolls which form a nipping part between them immediately below the lower end of the guide member and each of which is provided with a plurality of tilting vanes evenly spaced thereon, each roll rotating at a high speed in opposite directions so as to advance fibers through the nipping part; covers surrounding said rolls respectively with annular clearance left between the outer circumferences of the rolls and the covers, the covers having openings at the nipping part between the rolls and the covers being arranged to be in contact with the lower end walls of said guide member; and an endless conveyer provided with a suction mechanism.

* * * * *